(12) United States Patent
Larsen et al.

(10) Patent No.: US 6,205,673 B1
(45) Date of Patent: Mar. 27, 2001

(54) FRACTIONAL-DECIMAL VERNIER

(76) Inventors: Otis M. Larsen, 4036 Reservoir Blvd., Columbia Heights, Anoka, MN (US) 55421; Richard D. Larsen, 451 Taft St. NE., Minneapolis, Hennepin, MN (US) 55413

( * ) Notice: Subject to any disclaimer, the term of this patent is extended or adjusted under 35 U.S.C. 154(b) by 0 days.

(21) Appl. No.: 09/259,895

(22) Filed: Feb. 27, 1999

(51) Int. Cl.$^7$ ........................................... G01B 5/14
(52) U.S. Cl. ................................. 33/810; 33/679.1
(58) Field of Search .................... 33/1 D, 1 SB, 33/679.1, 542, 783, 810, 811, 812, 830

(56) References Cited

U.S. PATENT DOCUMENTS

| | | |
|---|---|---|
| D. 195,356 | 6/1963 | Keszler . |
| 442,020 | 12/1890 | Darling . |
| 750,204 | 1/1904 | Lachmann . |
| 897,437 | 9/1908 | Watson . |
| 1,321,567 * | 11/1919 | Spindler .................. 33/812 |
| 1,329,729 * | 2/1920 | Swartz ...................... 33/812 |
| 1,341,865 * | 6/1920 | Solberg ..................... 33/812 |
| 1,602,490 | 11/1926 | Homan . |
| 1,888,305 | 11/1932 | Berger . |
| 1,888,597 | 11/1932 | Huffman . |
| 1,969,624 * | 8/1934 | Salzbrenner ............ 33/812 |
| 2,304,265 * | 12/1942 | Magyari .................... 33/811 |
| 2,474,248 * | 6/1949 | Henry et al. ............. 33/1 D |
| 2,502,039 | 3/1950 | Floyd . |
| 2,908,979 * | 10/1959 | Backman ................ 33/811 |
| 3,177,588 * | 4/1965 | Sorensen ................. 33/783 |
| 3,449,052 * | 6/1969 | Rankin ..................... 33/1 D |
| 3,533,165 | 10/1970 | Larsen . |
| 4,607,436 | 8/1986 | Clay . |
| 5,084,982 * | 2/1992 | Feng ........................ 33/810 |
| 5,313,715 * | 5/1994 | Wang ....................... 33/810 |

FOREIGN PATENT DOCUMENTS

| | | |
|---|---|---|
| 904418 | 8/1972 | (CA) . |
| 475353 | 5/1915 | (FR) . |
| 1437948 * | 3/1966 | (FR) .................. 33/810 |
| 2604250 * | 3/1988 | (FR) .................. 33/810 |
| 103555 | 2/1917 | (GB) . |
| 560474 | 4/1944 | (GB) . |
| 761190 | 11/1956 | (GB) . |

* cited by examiner

Primary Examiner—G. Bradley Bennett
(74) Attorney, Agent, or Firm—Albert W. Watkins

(57) ABSTRACT

An attachment to a standard measuring rule includes a body with a three point mount for stably and securely supporting the measuring rule. Within the body a vernier is provided. In one embodiment the vernier is entirely co-planar with the rule, while in other embodiments the vernier is co-planar except for a zero-point marker. Additionally, the vernier is disclosed as an integral part of the body, or, alternatively, as a separate insert into the body. The vernier divides twenty-four one-eighth inch divisions into twenty-five equal parts, enabling vernier measurements in units of thousandths of an inch. Additional attachments including further bodies and verniers enable the standard rule to measure a wide variety of dimensions, while also enabling the use of either fractional or decimal representation on an easy to read scale.

15 Claims, 5 Drawing Sheets

FRACTIONAL-DECIMAL VERNIER

BACKGROUND OF THE INVENTION

1. Field of the Invention

This invention pertains generally to geometrical instruments, and more specifically to straight-edge rules that include an index for subdividing the scale, commonly referred to as a vernier.

2. Description of the Related Art

Devices for measuring distances and geometries of objects are quite old, dating back to prehistoric times. The early devices were designed to measure using units associated with commonly available objects, such as forearms, hands and feet. Distances were generally defined in whole units and fractions were used only infrequently, being more difficult to calculate and determine. Commonly available objects were identified that could be used for smaller and larger measurements, which reduced the need for fractions or large values. Eventually, whole unit measurements gave way to fractional divisions of existing units, such as the division of one foot into twelve equal inches. Inches were further divided into fractions by halves, into one-half inch, one-quarter inch, one-eighth inch and smaller divisions. For the purposes of this disclosure, fractional units are defined as this division of whole units by multiples of two, and will be specifically understood to include these units of half, quarter, eighth, and so forth.

As time has passed from those early days, so has the development of technology. Advances in technology requiring smaller, more durable, longer life devices have been accepted as commonplace, yet the foundation required for these advances is often misunderstood or taken for granted.

To manufacture smaller components, components at greater yield and lower prices, or components capable of special performance or reliability requires the ability to introduce precision into the tools, machines and processes are used to produce the resulting components. These tools, machines and processes must have the same or better precision than that of the finished component. Yet, determining the precision of the tools, machines and processes requires the use of measuring devices capable of measuring widely diverse devices and objects. The measuring devices must, once again, have precision equal or greater than the precision required of the tools. The precision must start with the instruments used to measure other devices and objects.

In modern production, these measurements are often more precise than would be readily identified by fractions of an inch, even though many measurements are still specified based upon the fractional system. For example, a hole might be identified as having a one-half inch diameter, but precision may be specified to the nearest hundredth of an inch. Another dimension may be specified as having an outside diameter of 0.625 inches, which is five-eighths of an inch, with a tolerance of plus or minus five thousandths of an inch. These types of mixed fractional and decimal dimensions are commonplace in a manufacturing environment today.

Unfortunately, the development of instruments that readily measure and evaluate these fractional and decimal dimensions has not kept pace with the changing needs of the manufacturing environment. Calculators have been developed that will perform conversions between decimal and fractional formats. However, these calculators are not well suited to a manufacturing environment, and are prone to being destroyed by contamination, spills or accidental impact with tools, equipment or the shop floor. They must also be carried about to be of any real use on the shop floor, therefore requiring yet another pocket or pouch. Furthermore, the use of a separate device from the measuring instrument requires a separate step of keying information into the calculator, taking valuable time and introducing the possibility of keying errors. Since there is no direct visual feedback of proportions or relationships between the units of measure, these mistakes may easily go unnoticed until a later time, when the cost of the error is amplified by production of many bad parts.

In the prior art, measuring devices frequently have fairly well developed attachments which allow the measurement of a wide and diverse set of components. Typically, these measurements will include inside and outside diameters, elevations, thickness, gap and other similar measurements. Unfortunately, and in spite of their flexibility at measuring diverse components, these instruments are calibrated to either fractional or decimal measuring, but do not provide the ready ability to convert from one format to another.

U.S. Pat. No. 897,437 to Watson is representative of early versions of measuring instruments having both coarse and fine measurement which are capable of measuring a variety of dimensions. A straight rule is provided that has standard graduations marked thereon. Onto the rule there are clamped several arms which extend perpendicularly from the rule. These arms enable the measurement of diverse dimensions by allowing a part to be placed between the arms, to measure thickness or outside diameter, or allowing the arms to be placed within the part, such as for inside diameter. While these types of instruments have met with great success in the trade because of their tremendous versatility in taking measurements of many different types, several deficiencies are noteworthy. In particular, one or both of the adjustable arms cover a large number of graduations on the rule. Since most rules use larger and smaller marks to distinguish different graduations, covering up adjacent marks makes it much more difficult to discern quickly and accurately the particular graduation that is exposed. In addition, the precision of these devices is limited to the smaller sizes of graduations that may be placed upon the scale. While in theory a very large number of such graduations are possible, attempting to place them on the scale and still remain legible and useful is not practically possible. In practice, even scales divided to a sixteenth of an inch become visually "busy", and these finer scales require more time to accurately discern the measurement.

A second limitation is in the ability to quickly convert from fractions to decimals, such as when the part is specified by a combination of fractional and decimal units.

A third limitation arises from the fact that the alignment for measuring must occur between two perpendicular planes. The vertical edge of a movable body must be visually aligned with a horizontal Graduation mark. Because the vertical edge and horizontal mark are not co-planar. and are furthermore not of similar width and dimension, accurate correlation between the two different structures is difficult. As a result, any precision beyond the usual sixteenth of an inch is increasingly difficult.

In order to overcome the human visual limitation of reading closely spaced graduations, vernier scales were developed such as disclosed by Homan in U.S. Pat. 1,602, 490; Berger in U.S. Pat. No. 1,888,305; and Huffman in U.S. Pat. No. 1,888,597. The graduations on the vernier align with the main scale only at the appropriate fractional point of measurement. For example, in the decimal system of measurement, a vernier will divide into ten equal spaces the distance occupied by nine spaces on the scale. When the first vernier graduation mark aligns with a graduation mark on the main decimal scale, the vernier will indicate one-tenth the smallest main scale division. So, carrying this example further, if the main scale is divided into tenths of an inch, the vernier will be calibrated to identify hundredths of an inch without visually cluttering the main scale. This concept has also been widely adapted into the measuring instruments of the prior art, since they quickly advanced the resolution of these versatile instruments.

Alternatives to the vernier have been proposed, such as the sawtooth line of Clay in U.S. Pat. No. 4,607,436. However, these alternatives have not proven to offer sufficient benefit in reading the scale with precision for most applications. Furthermore, these scales are more difficult to produce with the intended accuracy.

There is a definite need to convert readily between fractional and decimal units, without the need for resorting to special calculators or extremely expensive and complicated devices. This need has not been satisfied by existing instruments.

SUMMARY OF THE INVENTION

In a first manifestation, the invention is an instrument for measuring distances. A rule is provided having primary fractional graduations. An adjustable body which is movable with respect to the rule has vernier index graduations adjacent to the rule's fractional graduations for subdividing the rule. Alignment of one vernier index graduation with an adjacent rule fractional graduation designates a decimal division of the rule's fractional graduation.

In a second manifestation, the invention is a rule for measuring a distance accurately to eighths of an inch precision and a first vernier for measuring distance accurately to five-thousandths of an inch precision. A zero point on the rule represents a magnitude of distance equal to zero. One-eighth inch graduations on the rule extend from the zero point and represent increasing distance. Twenty-five equally spaced graduations arc provided within a three inch space on the vernier. The twenty-five vernier graduations are compared with one-eighth inch graduations on the rule for correspondence therebetween, such that when one of said twenty-five vernier graduations is more closely aligned with an adjacent one of the one-eighth inch graduations than any other of the twenty-five vernier graduations to other ones of one-eighth inch graduations, the relative position of the closest one of the twenty-five graduations relative to the first one of the twenty five graduations may be multiplied by five thousandths of an inch. The result is subsequently added to a one-eighth inch fractional distance measurement from the zero point, which has also been converted to decimal format, to thereby calculate a measurement with five-thousandths of an inch precision without interpolation.

In a third manifestation, the invention is a method of measuring a first distance between a first point and a second point with a fractionally graduated rule and converting the distance measurement into a decimal distance measurement. The method comprises the steps of: aligning a measuring structure coupled to the fractional rule to one extreme of the distance to be measured; moving a block, carrying a zero-point marker and a vernier having vernier graduations therewith, relative to the fractional rule to align a second measuring structure to the other extreme of the distance to be measured; calculating the smallest fractional distance between a zero measurement position on the fractional rule and the zero-point marker on the block, whereby when the distance is zero the zero-point marker aligns with the zero measurement position on the fractional rule; converting the smallest fractional distance to a first decimal value; identifying the closest vernier graduation to a fractional graduation; multiplying by a decimal amount the number of vernier graduations the closest vernier graduation is from the zero point marker to produce a second decimal value; and adding the first decimal value and second decimal value together to produce a sum equal to the decimal distance measurement.

In a fourth manifestation, the invention is a measuring attachment for a fractional rule with fractional graduations on a first surface, a second surface opposite the first surface, and third and fourth surfaces perpendicular and interconnecting the first and second surfaces, comprising: a block for supporting a vernier adjacent and co-planar to the first surface, the block further having a groove therein for supporting the second surface of the fractional rule; a means for repeatably and releasably compressing the third surface of the fractional rule against a generally parallel surface within the groove; wherein the rule and measuring attachment may be adjusted relative to each other and the compressing means may be activated to compress the third surface against the generally parallel groove surface, to thereby prevent further movement therebetween and allow co-planar calculation of distance and vernier.

OBJECTS OF THE INVENTION

A first object of the invention is to provide a vernier for use with a common fractional rule which converts the fractional rule into decimal measurements. A further object of the invention is to provide decimal precision in thousandths of an inch from an eighth-inch rule scale. Another object of the invention is to provide the vernier as part of an assembly which adapts a standard rule to the measuring of many diverse dimensions. Yet another object of the invention is the provision of a vernier on the same plane as the rule graduations, which further only minimally or more preferably does not at all block the adjacent rule graduations. Another object of the invention is the provision of both fractional and decimal verniers on the same device, most preferably both co-planar with the standard rule. These and other objects of the invention are accomplished in the preferred embodiment, which will be best understood when considered with the accompanying drawings.

BRIER DESCRIPTION OF THE DRAWINGS

FIG. 4a illustrates the exact alignment of a set of graduations of the first three embodiments, while

DESCRIPTION OF THE PREFERRED EMBODIMENTS

Figure 1:
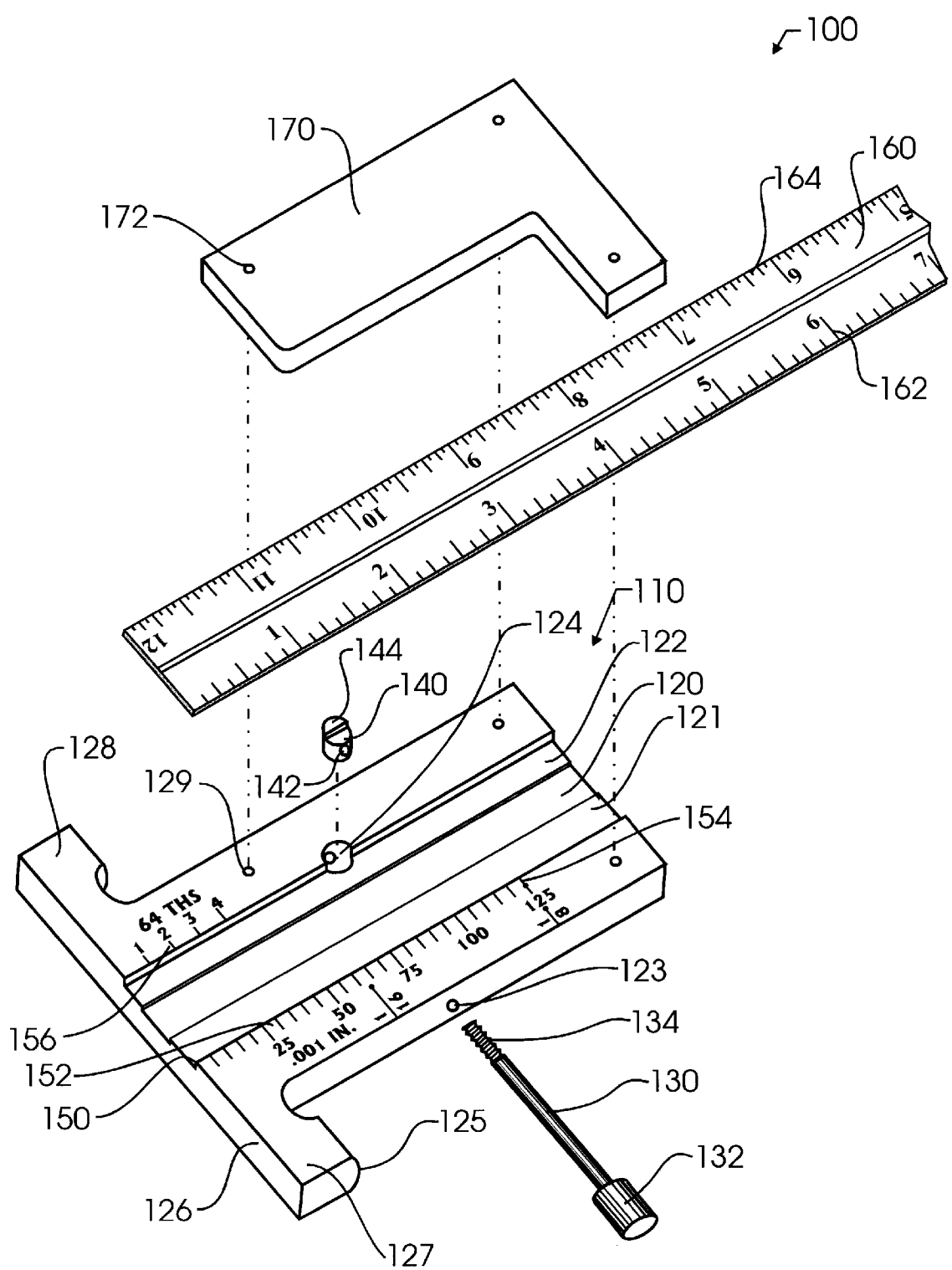
FIG. 1 illustrates a first embodiment of the invention by exploded assembly view.

FIG. 1 illustrates a first embodiment of the invention which incorporates the teachings of the invention into a compact, portable, rugged and versatile instrument 100 which finds utility in measuring a variety of dimensions. Instrument 100 has a base 110 which acts as a primary substrate about which other components may be assembled. Within base 110 is a longitudinal groove 120 having slightly elevated edges 121, 122. Groove 120 with edges 121, 122 acts as a receiver into which a standard rule 160 may be placed. The actual length of rule 160 is irrelevant to the invention, though a typical one-foot rule is shown in this illustration. By providing slight edges 121 and 122 within groove 120, rule 160 will be more securely held with less tendency towards wobble, in the event either rule 160 or base 110 are not perfectly planar. Base 110 additionally has a hole 123 extending transverse through body 120, and hole 123 passes through a perpendicular opening 124. Into hole 123 may be inserted a hand or thumb screw 130 having a small head 132 and threads 134. Into hole 124 a generally cylindrical rod 140 may be inserted. Rod 140 has a threaded hole 142 therein which is designed to mate with threads 134. In view of the cylindrical nature of hole 124 and rod 140, rod 140 will not be able to spin in the direction of thread rotation. Therefore, when thumb screw 130 is rotated, rod 140 will be drawn by threads 134 towards head 132. With rule 160 placed within groove 120, the small elevated region 144 of rod 140 will be drawn against edge 164 of rule 160, which will in turn push rule 160 towards vernier 152. Most preferably, vernier 152 will be slightly elevated at ends 150, 154 thereon ensuring a two point contact between vernier 152 and edge 162. By so designing the interface between rule 160 and body 120, several advantages may be attained. First, a three-point anchor is provided at region 144 and ends 150 and 154 which is very secure and free from wobbling which would otherwise make precise and repeatable measurements difficult or impossible. Second, surface graduation marks upon rule 160 are co-planar with surface graduation marks on body 110, making the comparison of marks much easier than was known in the prior art. Since graduation marks may be typically depressed slightly into the surface or alternatively raised therefrom, light reflecting from the differences in graduation mark elevation may be reflected and optically determined from rule to vernier, allowing a person to more easily visually determine alignment of marks to great precision.

Body 110 may further include various surfaces useful in measuring special dimensions or shapes, such as inside diameter or height measuring lip 125, arms such as arms 127 and 128, and an outside diameter or thickness or height measuring face 126. In addition, as shown in this embodiment, several different verniers 152 and 156 may be provided adjacent on opposite edges of rule 160, so that measurements may be taken in the standard fractional scale through vernier 156, or through the decimal vernier 152 which will be described in greater detail hereinbelow.

A cover 170 is preferably provided which serves as a fourth enclosing surface to help retain and guide rule 160 within groove 120. Cover 170 has holes 172 formed therein through which threaded or other fasteners may pass, preferably extending into threaded holes 129 within body 110. Cover 170 may take a variety of shapes, but most preferably the "L" shape illustrated in FIG. 1 offers significantly improved visibility to each of the verniers 152, 156. Cover 170 will not block graduation marks which may be needed to quickly ascertain a measurement, where, as aforementioned in the prior art, these adjacent marks were covered.

Figure 2:
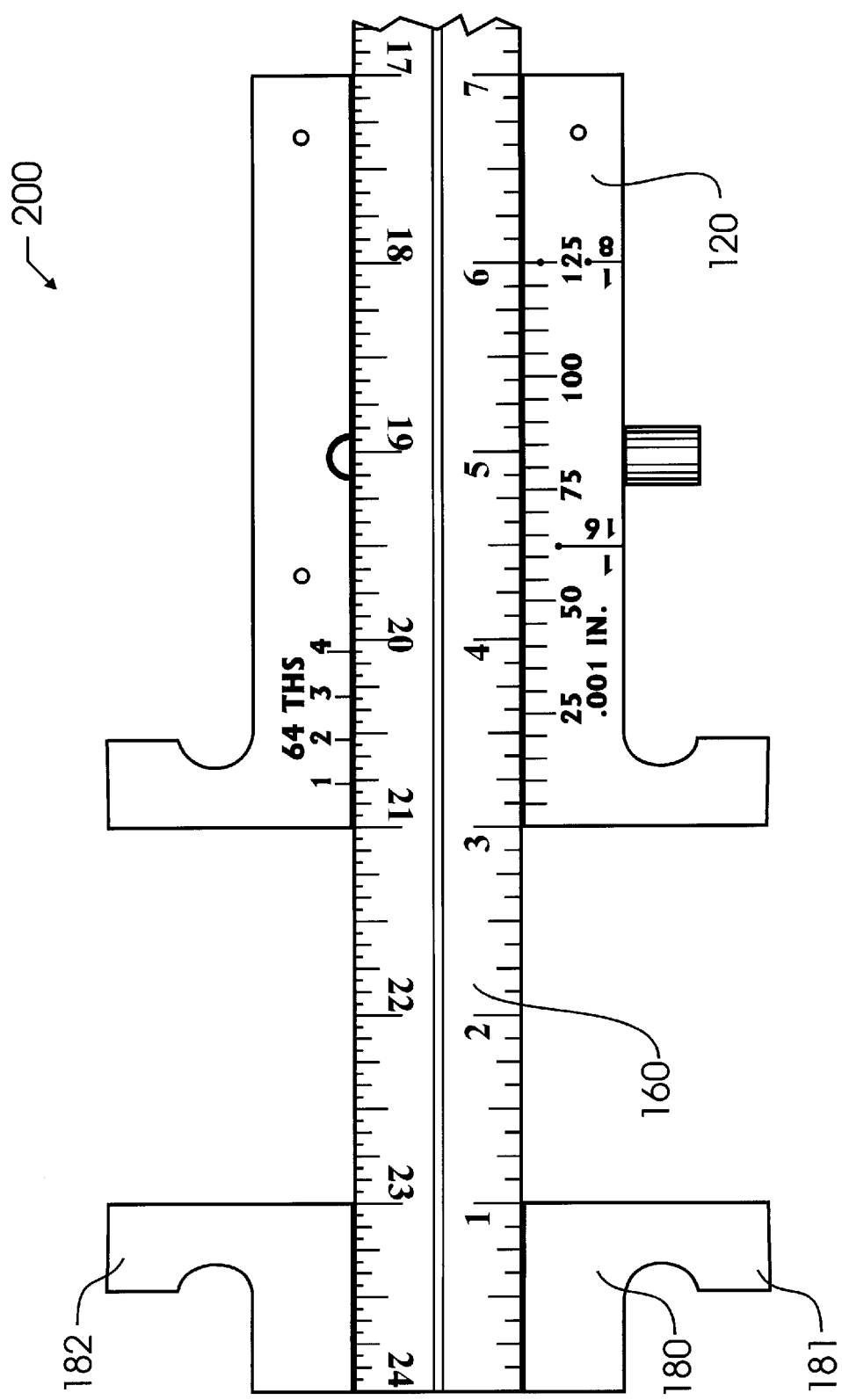
FIG. 2 illustrates a second embodiment of the invention by top plan view.

FIG. 2 illustrates an instrument 200 of similar embodiment to instrument 100 from a top plan view, with cover 170 removed therefrom. In the instrument 200, an additional arm structure 180 is provided at one end of 160. Arm structure 180 may be permanently affixed, or may be removable therefrom. In the most preferred construction of instrument 200, arm structure 180 is one-inch wide adjacent to rule 160. Furthermore, arms 181, 182 and 127, 128 are each exactly one-half inch wide. By so dimensioning the arms, an inside diameter measurement may be taken and read directly from rule side 162, using point 150 as the zero marker point. In other words, as shown by the position of body 110 in FIG. 2, an inside diameter measurement of this position would equal exactly three inches. An outside diameter measurement or thickness would equal one inch less, or exactly two inches. Those skilled in the art will readily recognize that other dimensions may be used. Nevertheless, these particular dimensions have been found to be most preferred.

Figure 3:
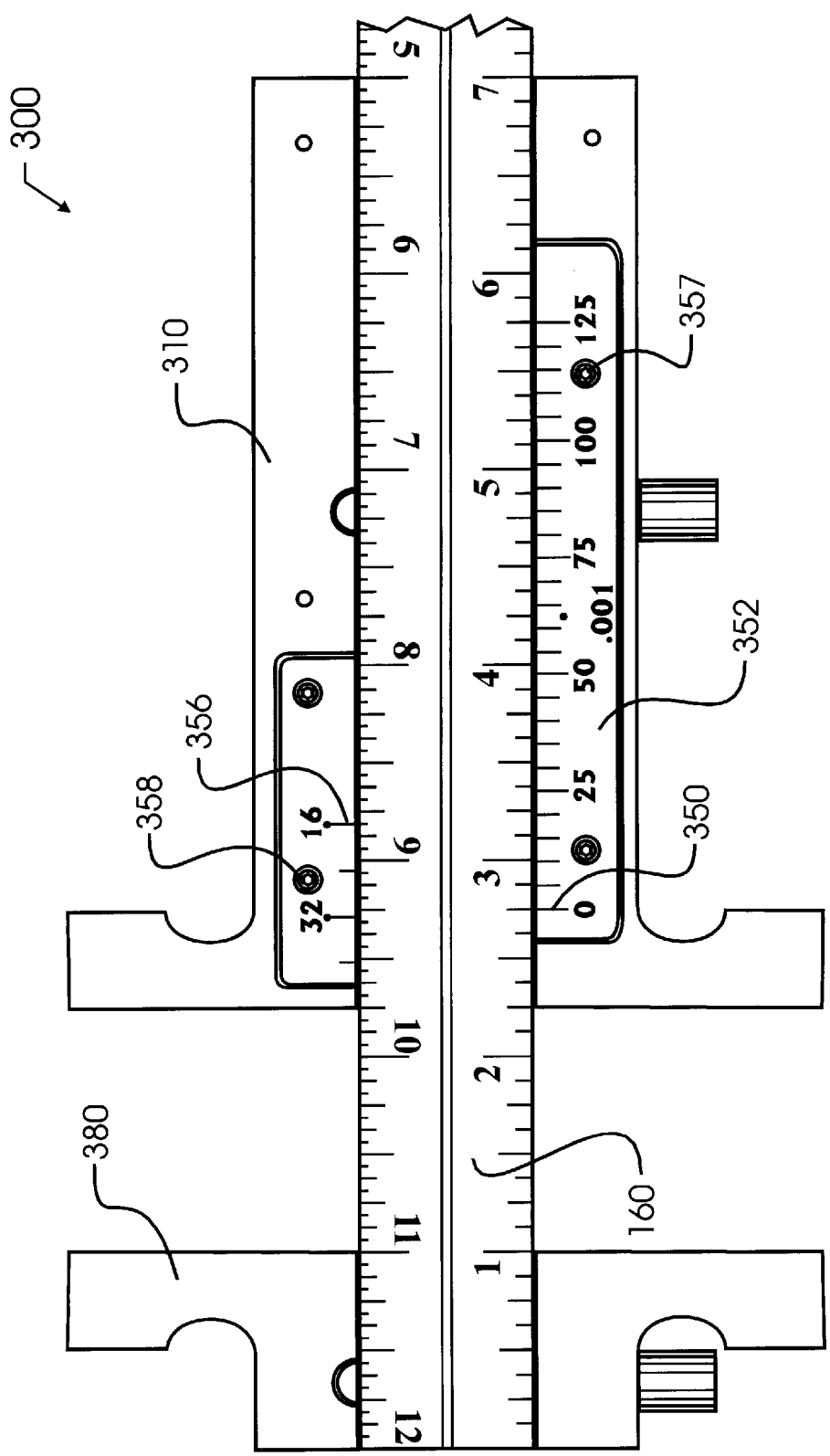
FIG. 3 illustrates a third embodiment of the invention by top plan view.

FIG. 3 illustrates a third embodiment of the invention which has special vernier inserts 352 and 356 which may be formed separately from body 310 and then attached thereto by, for illustration purposes, screws 357, 358. These separate verniers 352, 356 may be made very precisely, and separately from body 310, thereby saving the special treatments for only those components that truly require them. In the event of any distortions during heat treatment, the verniers 352, 356 may be adjusted by loosening screws 357 and 358 to ensure proper alignment with body 310. In practice, these verniers 352, 356 are most preferably exactly one-half inch offset from leading edge 126. This placement does not alter the operation of the vernier in any way.

Instruments 100, 200 and 300 each have a fractional vernier adjacent edge 164 of rule 160. This vernier is most preferred, but not essential. Adding this fractional vernier allows the single instrument to be used for more diverse measurements. Each instrument 100, 200, 300 also has a decimal vernier 152, 352 adjacent edge 162 of rule 160. This decimal vernier is formed by dividing three inches into twenty-five equal spaces. These spaces, center-to-center, are then equal to 0.120 inches. On the standard rule, the eighth-inch spacings are equal to 0.125 inches, which means that each vernier increment represents exactly 0.005 inches. This allows the fractional rule to be used to take measurements in thousandths of an inch. Furthermore, the eighth-inch graduations are readily converted by a table, which might, for example be printed directly on the back side of body 110, into the decimal equivalents of 0.125, 0.250, 0.375, 0.500, 0.626, 0.750, and 0.825 inches. By adding the correct numbers of 0.005 inches, based upon the vernier reading, to the decimal equivalent of the eighth-inch scale, an operator can readily determine measurements in thousandths units.

Figure 4A:
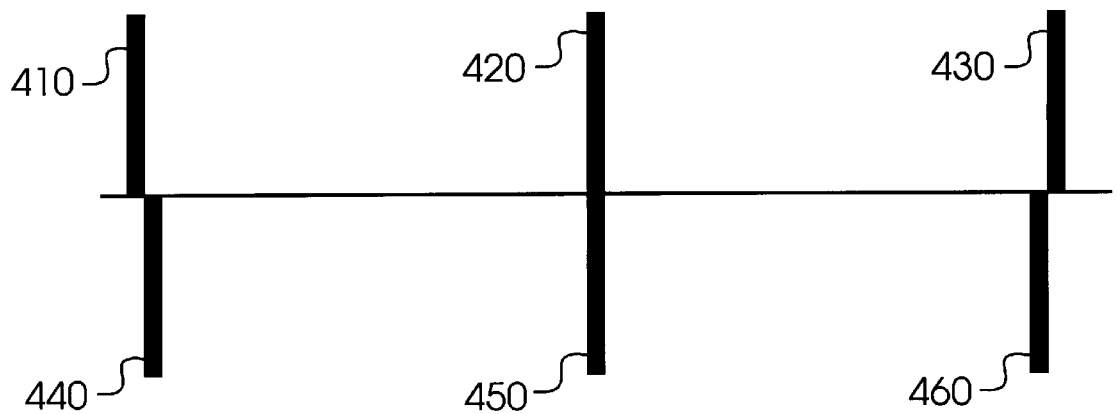
Figure 4B:
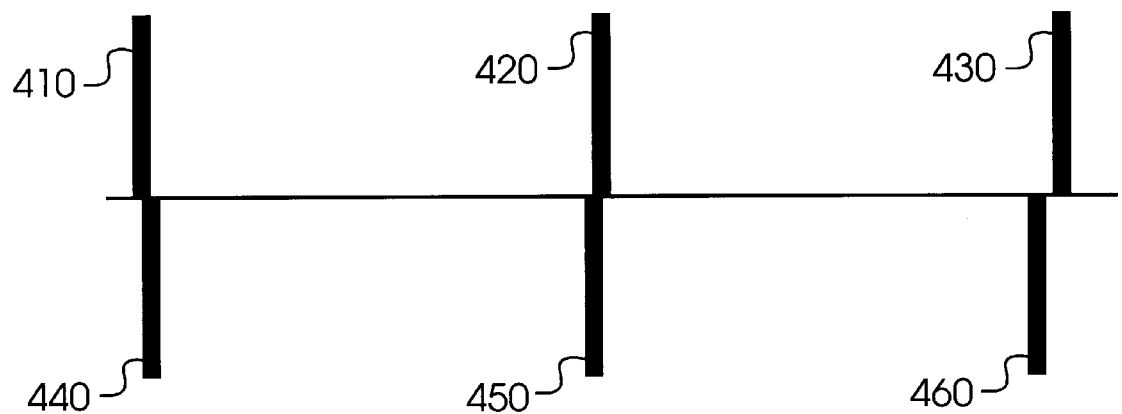
FIG. 4b illustrates interpolation which results from equidistant spacing between two adjacent graduations.

FIGS. 4a and 4b illustrate another feature of the preferred embodiment, wherein rule graduation marks 410, 420 and 420 are adjacent decimal vernier graduation marks 440, 450, 460. As shown in FIG. 4a, vernier mark 450 is aligned exactly with rule graduation 420. If each of the graduations on the rule and vernier are exactly 0.005 inches in width, the 0.120 inch center to center spacing between marks 440 and 450, when added to the 0.005 inches width of mark 440, will bring mark 440 just to the edge of mark 410, which is 0.125 inches on center from mark 420. As a result, the edges of marks 440 and 460 will align with the edges of marks 410, 430, as shown therein.

As can be seen in FIG. 4b, an interpolation feature is also possible when each of the graduation marks 410–460 are equal to the difference in center to center spacings between the rule and vernier. As seen therein, when none of the marks exactly align, but two adjacent marks are equidistant between vernier and rule, such as adjacent marks 410, 420 which are, in FIG. 4b equidistant to marks 440, 450 of the vernier scale, the actual vernier calculation is the average of the two adjacent marks. In other words, the actual vernier distance will be the sum of vernier amounts calculated for mark 440 and 450, the sum then divided by two. In effect, this allows relatively precise interpolation to 0.0025 inches with consistency.

Important is the process for determining the actual graduation mark width. The graduation marks are most preferably exactly equal to the difference in spacing between the vernier and the rule. As long as this is true, this phenomenon of FIG. 4 will then apply to other dimensions besides the eighth-inch rule and five-thousandths vernier of the preferred embodiment. Nevertheless, the eighth-inch unit is the only unit which converts to the desired thousandths precision, so this combination is the most preferred of the present invention.

Figure 5:
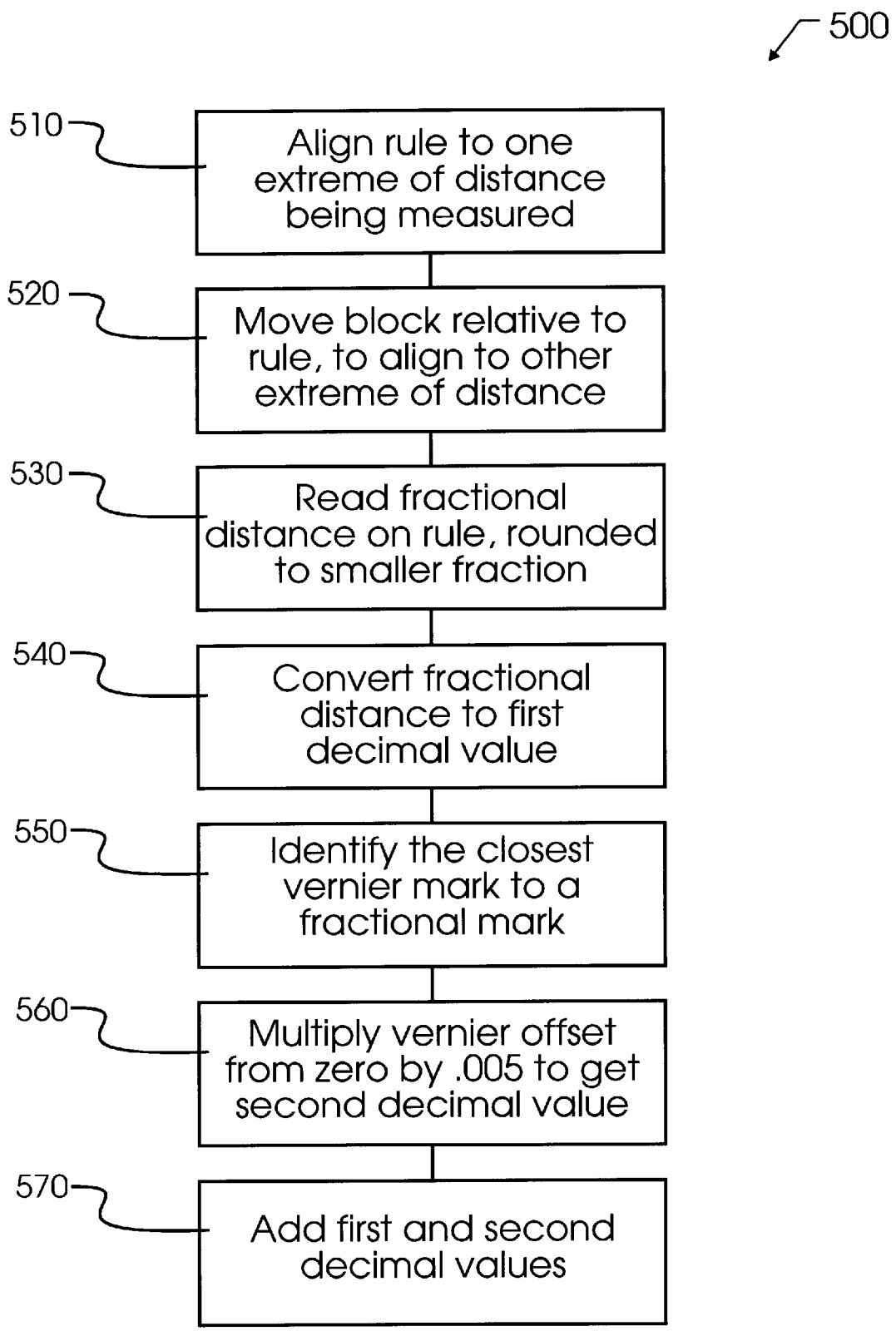
FIG. 5 illustrates a preferred method for conversion of fractional measurements to decimal values in accord with the present invention.

FIG. 5 illustrates by flow chart the process 500 of calculating the decimal vernier in more detail. Therein, the first step 510 is to position the rule relative to one extreme of the distance being measured. This is typically accomplished by placing either an end of the rule or arms such as arms 181, 182 against the first extreme edge to be measured. Next, in step 520, block 110 or 310 will be moved relative to rule 160 until the appropriate feature of the block is adjacent the other extreme edge to be measured. In step 530 the fractional rule is read, making sure that if a measurement is between two fractions, the smaller amount is used as the fractional amount. In other words, if the value is between one-eighth and one quarter of and inch, the one-eight inch value is the one that should be used. That fractional measurement, which will also include whole numbers for the total number of full inches, will be converted to a decimal value in step 540. This will most preferably be accomplished using a look-up table or chart for each of the seven discrete fractions, though other techniques may be used.

The next steps 550 and 560 are listed in sequential order following steps 530 and 540, but it is important to note that the actual order of these steps is not critical and that steps 550 and 560 could, in fact, come before steps 530 and 540. In steps 550 and 560, the vernier marks are compared to the rule fractional graduation marks to find the closest ones. Once that is done, an operator will count from the zero mark vernier graduation the number of vernier graduation marks to the closest mark. This number is multiplied in step 560 by 0.005 to calculate a second decimal value which represents the vernier offset from the fractional distance of step 530. Once that is done, the first decimal value of step 540 is added to the second decimal value of step 560, to obtain the full measured distance in decimal format. In the event two marks are equidistant at step 550, then the average of the two marks must be used to get an accurate measure, as was previously discussed in reference to FIG. 4*b*.

By placing the graduation marks upon the top surface of the rule and vernier, and keeping these marks closely adjacent, optical alignment and visual determination of precision approaching one-thousandth of an inch are viable. However, the inventors recognize that the principles of this feature of the invention, dividing a fractional rule with a decimal vernier, may be implemented by other methods besides optical and visual discrimination. Other methods may be considered by those skilled in the art, such as electrical or electromagnetic interpolations and digital displays, the use of microprocessors to perform the basic computations illustrated herein for the calculation of the actual distances, and so on. Nevertheless, the preferred embodiment offers the advantages of durability and simplicity, making this construction optimal for a harsh production environment.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

We claim:

1. An instrument for measuring distances comprising:
   a rule having a whole unit scale and primary fractional graduations dividing said whole units by multiples of two into halves, quarters and eighths; and
   an adjustable body which is movable with respect to said rule and which has vernier index graduations adjacent to said primary fractional graduations for subdividing said primary fractional graduations into equal vernier index graduations said vernier index graduations when added to a decimal equivalent of said primary fractional graduations dividing said whole units into precise decimal units of said whole units;
   wherein alignment of one of said vernier index graduations with an adjacent primary fractional graduation designates a decimal division of said primary fractional graduation.

2. The instrument for measuring distances of claim 1 wherein each one of said primary fractional graduations represent a space equal to one-eighth of an inch from adjacent graduations.

3. The instrument for measuring distances of claim 2 wherein said decimal division is in units of five-thousandths of an inch without interpolation.

4. The instrument for measuring distances of claim 1 wherein said rule is a standard straightedge rule, and said adjustable body is removable therefrom.

5. The instrument for measuring distances of claim 4 wherein said rule is divided into one-eighth of an inch graduations.

6. The instrument for measuring distances of claim 1 wherein said primary fractional graduations are on a top plane of said rule.

7. The instrument for measuring distances of claim 6 wherein said primary fractional graduations are on a perimeter of said top plane.

8. The instrument for measuring distances of claim 6 wherein said vernier index graduations are coplanar with said top plane.

9. The instrument for measuring distances of claim 1 further comprising a second fractional vernier adjacent said primary fractional graduations for subdividing said primary fractional graduations into smaller fractional graduations.

10. A rule for measuring a distance accurately to eighths of an inch precision directly on said rule and a first vernier for measuring said distance accurately to five-thousandths of an inch precision on said first vernier, comprising in combination:
   a zero point on said rule representing a magnitude of said distance equal to zero;
   one-eighth inch graduations on said rule extending from said zero point and representing increasing distance from said zero point; and
   twenty-five equally spaced graduations within a three inch space on said vernier, beginning with a first one of said twenty-five graduations located in a first proximity to said zero measuring point, a remaining twenty-four of said twenty-five graduations more remote than said first proximity relative to said zero measuring point, wherein said twenty-five vernier graduations may be compared with said one-eighth inch graduations on said rule for correspondence therebetween;

whereby when a second one of said twenty-five vernier graduations is more closely aligned with a first one of said one-eighth inch graduations than any other of said twenty-five vernier graduations to other ones of said one-eighth inch graduations, the relative position of said second one of said twenty-five graduations relative to said first one of said twenty five graduations may be multiplied by five thousandths of an inch, and the result subsequently added to a one-eighth inch fractional distance measurement from said zero point which has been converted to decimal format, to thereby calculate a measurement with five-thousandths of an inch precision, without interpolation.

11. The rule of claim 10 wherein said twenty-five vernier graduations are each five-thousandths of an inch wide and wherein said one-eighth inch graduations are each five-thousandths of an inch wide, whereby, when said second one of said twenty-five vernier graduations is most closely aligned with said first one of said one-eight inch graduations, two vernier graduations most closely adjacent to said second one of said twenty-five vernier graduations will each have an edge aligned with an edge of two of said one-eighth inch graduations most closely adjacent to said first one of said one-eight inch graduations, and the relative position of said second one of said twenty-five graduations relative to said first one of said twenty five graduations is multiplied by five thousandths of an inch, and the result subsequently added to a one-eighth inch fractional distance measurement from said zero point which has been converted to decimal format, to thereby calculate a measurement with five-thousandths of an inch precision without interpolation.

12. The rule of claim 11 wherein, when two adjacent ones of said one-eight inch graduations are each equidistant from two adjacent ones of said twenty-five vernier graduations, and said two adjacent ones of said one-eight inch graduations are more closely aligned with said two adjacent ones of said twenty-five vernier graduations than any remaining one of said one-eighth inch graduations are to any remaining one of said twenty-five vernier graduations, the relative position of said two of said twenty-five graduations relative to said first one of said twenty-five graduations may be averaged and multiplied by five thousandths of an inch, and the result subsequently added to a one-eighth inch fractional distance measurement from said zero point which has been converted to decimal format, to thereby calculate a measurement with two and one-half thousandths of an inch precision, as a first interpolation.

13. The rule of claim 10 further comprising a second vernier dividing said one-eighth inch graduations into sixty-fourths of an inch on said second vernier.

14. A method of measuring a first distance between a first point and a second point with a fractionally graduated rule having a whole unit scale and primary fractional graduations dividing said whole units by multiples of two into halves, quarters and eighths and converting said distance measurement into a decimal distance measurement dividing said whole unit scale into tenths, hundredths and thousandths, comprising the steps of:

aligning a first measuring structure coupled to said fractional rule with said first point;

moving a block, carrying a zero-point marker and a vernier having vernier graduations therewith, relative to said fractional rule to align a second measuring structure to said second point;

calculating the smallest fractional distance between a zero measurement position on said fractional rule and said zero-point marker on said block, whereby when said first and said second point are in the same physical position, said zero-point marker aligns with said zero measurement position on said fractional rule;

converting said smallest fractional distance to a first decimal value;

identifying a most closely spaced vernier graduation to a fractional graduation;

multiplying by a decimal amount the number of vernier graduations said most closely spaced vernier graduation is from said zero point marker to produce a second decimal value; and adding said first decimal value and said second decimal value together to produce a sum equal to said decimal distance measurement.

15. The method of measuring of claim 14 wherein said decimal distance measurement is a 3 digit decimal value and said fractional rule is divided into one-eighth of an inch graduations, whereby said one-eight of an inch graduations are directly convertible to multiples of one hundred and twenty-five thousandths of an inch per graduation.

* * * * *